Nov. 12, 1935.  L. R. QUARLES  2,020,961
MOTOR ACCELERATING CONTROL SYSTEM
Filed June 10, 1932  3 Sheets-Sheet 2
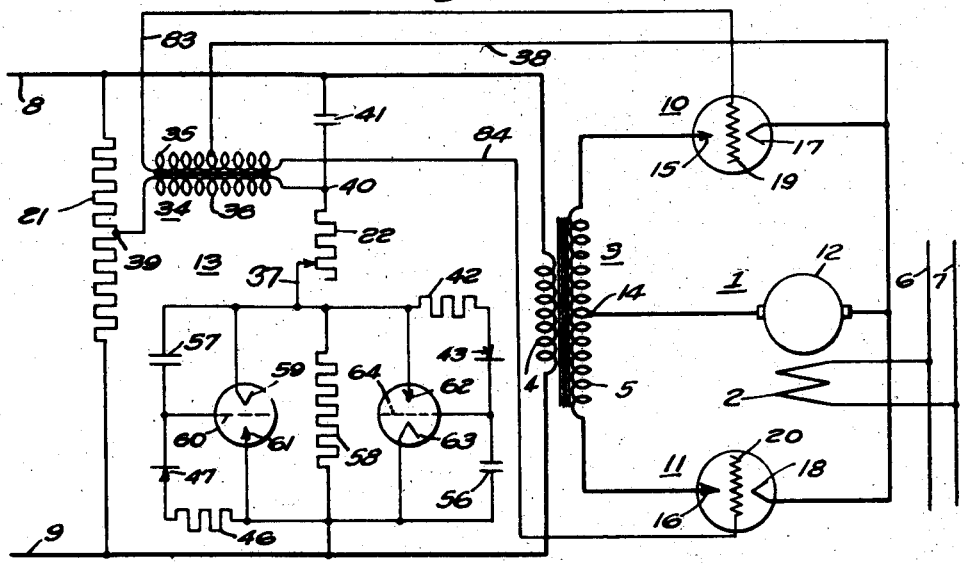
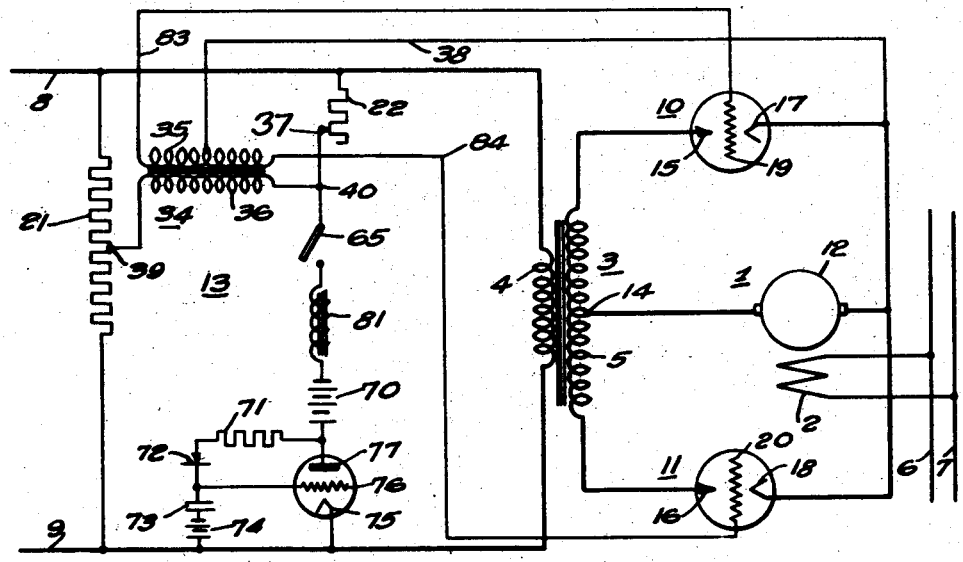
WITNESSES:
INVENTOR
Lawrence R. Quarles.
BY W. R. Coley
ATTORNEY Nov. 12, 1935.  L. R. QUARLES  2,020,961

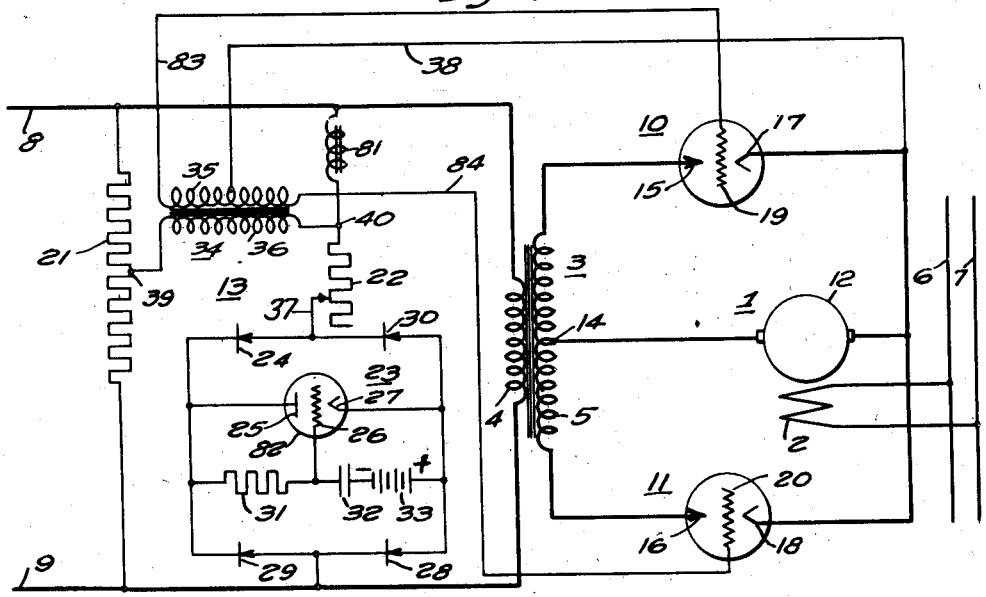

MOTOR ACCELERATING CONTROL SYSTEM

Filed June 10, 1932  3 Sheets-Sheet 3

WITNESSES:
E. A. McCloskey.
Wm. C. Groome

INVENTOR
Lawrence R. Quarles.
BY
W. R. Coley
ATTORNEY

Patented Nov. 12, 1935

2,020,961

UNITED STATES PATENT OFFICE 2,020,961

MOTOR ACCELERATING CONTROL SYSTEM

Lawrence R. Quarles, Wilkinsburg, Pa., assignor to Westinghouse Electric & Manufacturing Company, East Pittsburgh, Pa., a corporation of Pennsylvania Application June 10, 1932, Serial No. 616,486

17 Claims. (Cl. 172—288)

My invention relates generally to control systems and more particularly to control systems that may be utilized for operating electric motors.

An object of my invention is the provision of a control system of the class indicated that shall be simple and reliable in operation and be readily and economically manufactured and installed.

Another object of my invention is to control the acceleration of a direct current motor when connected to a source of alternating current by the use of electronic discharge devices also interconnected with the source of alternating current.

A further object of my invention is to provide for controlling the acceleration of an electric motor without the use of accelerating contactors.

A still further object of my invention is to automatically and in a continuous manner accelerate an electric motor from rest to any preselected speed.

Another object of my invention is to prevent the acceleration of a motor to a selected speed faster than a predetermined rate and thereafter to vary the speed of the motor as desired.

Additional objects of this invention and the novel and useful features thereof will become more apparent from a study of the following specification particularly when such study is made in conjunction with the drawings accompanying the specification and, in which:

Figure 1 is a diagrammatic view of a control system embodying features of my invention;

Figs. 2, 3 and 4 are diagrammatic views of other control systems that embody modifications of the features of my invention;

Figure 5:
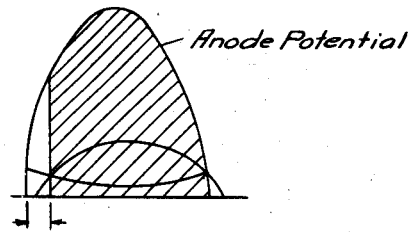
Fig. 5 is a graphical representation of the electrical characteristics of a power gas-filled grid controlled tube in which the shaded portion indicates the time the current is flowing between the anode and the cathode at a definite phase angle between the potential of the anode and the grid.

With particular reference to Fig. 1, my invention comprises, in general, a motor 1 having a field winding 2, a transformer 3 having a primary winding 4 and a secondary winding 5. The field winding 2 may be energized from suitable direct current buses 6 and 7 or, what will be more preferable when only alternating current is available, may be energized from alternating current buses 8 and 9 through suitable asymmetric units or rectifiers connected intermediate buses 8 and 9 and buses 6 and 7. A pair of gas-filled grid controlled tubes 10 and 11 are provided for connecting the armature 12 of the motor 1 in circuit relation with the secondary winding 5.

To energize the units and circuits to which reference has just been made, suitable switches, not shown, are provided intermediate the power station and the buses 8 and 9. A bridge phase-shifting circuit 13 is provided for shifting the phase angle of the grid potentials of the gas-filled grid controlled tubes 10 and 11 relative to their respective anode potentials.

The power tubes 10 and 11 are essentially gas-filled grid-controlled gaseous discharge tubes and comprise, respectively, anodes 15 and 16, and cathodes or filaments 17 and 18, which are generally called the conducting electrodes, and grids 19 and 20, which are usually termed the control electrodes. Inasmuch as power grid-glow tubes have the property of rectifying alternating current, I provide for utilizing two in order to give double-wave rectification. However, it will be readily understood that my invention is operable by using only one grid-controlled tube.

The power tubes 10 and 11 are preferably of the well known type wherein the cathode comprises a filament surrounded by an inert gas. The filament when electrically heated by a suitable source of current, liberates primary electrons which are necessary for the functioning of the tube. When a potential difference is applied between the anode and cathode, the anode being at a high potential, and liberated electrons move towards the anode. As these electrons acquire sufficient velocity, they collide with the molecules of the gas and produce both, new electrons and positive ions. As the primary electrons and the newly formed electrons move toward the anode they have to pass the grid structure. The grid may be charged either by a positive or negative potential and, therefore, helps either to accelerate or retard the movements of the passing electrons. Hence the action of the grid is such as to control the value of the anode-cathode potential at which the gas becomes ionized, or at which an arc is formed for the passage of a current between the anode and cathode. For convenience, and in accordance with engineering parlance, the potential of the grid will hereinafter be considered with reference to the potential of the anode. For a given anode potential, there is a definite critical grid potential at which ionization occurs, thus allowing the tube to pass current in the form of an electric arc. (See Figs. 5 to 10, inclusive.)

If the potential of the grid is below this critical grid potential, no discharge occurs, and accordingly, no current passes between the anode and the cathode. On the contrary, if the potential of the grid rises above the critical grid potential, even if only for a moment, a discharge immediately occurs and current passes in the form of an electric arc between the anode and cathode. After the arc is started, the ionized gas prevents the formation of a space charge and the arc is continued. Consequently, the grid of a gaseous discharge tube is effective only in preventing or initiating an arc, but is not effective to extinguish the arc after it has once been started. The grid, however, regains control if the flow of current between the anode and cathode ceases momentarily thus allowing the gases to deionize. Therefore, by applying an alternating current voltage to the anode and cathode, the grid has an opportunity of regaining control once every cycle and can delay the starting of an arc for as long a time during the cycle as the potential of the grid is below the critical grid potential.

For the current control of grid-controlled gas-filled tubes, three fundamental methods, well known in the art, are available. In the first or "magnitude" method, the phase relation of the grid potential relative to the anode potential remains fixed, but the magnitude of the grid potential varies relative to the anode potential to thus control the current that may pass between the anode and the cathode. In the second or "phase-shifting" method, the magnitude of the grid potential remains substantially fixed relative to the anode potential, but the phase relation of the grid potential relative to the anode potential is shifted thereby controlling the current passing between the anode and the cathode. The third method embodies a combination of the "magnitude" and "phase-shifting" methods. In the practice of my invention, I prefer the "phase-shifting" method.

When using the "phase-shifting" method to control the grid potential of a tube or tubes utilized to control the speed of a direct current motor supplied with energy from a source of alternating current, a severe duty is imposed on the tube or tubes particularly when the motor is starting. This severe duty, or dangerous, or tube-destroying demand on the tubes is especially serious when the armature circuit of the motor and associated control circuits are set to apply full voltage to the motor. It is, therefore, very desirable to have some automatic, yet simple, means of accelerating the motor slowly, thus preventing excessive current on the tube before all parts to be heated have attained the normal operating temperature.

The protection to the tubes and the slow automatic acceleration of the motor may be accomplished by slowly shifting the phase relation of the grid potential regardless of the final speed setting of the main speed control.

One method for accomplishing the desirable results just pointed out and the arrangement of means are shown by the bridge or phase-shifting circuit 13 shown in Fig. 1. This circuit comprises a resistor 21 connected directly across the alternating current supply lines 8 and 9 and a reactor 81, a variable resistor or main speed control means 22, and automatically operable circuit arrangement 23, all connected in series, but connected in parallel to the resistor 21. The primary winding 36 of a transformer 34 is connected intermediate the junctions 39 and 40. The junction 39 is positioned at the midpoint of the resistor 21, whereas the junction 40 is positioned intermediate the reactor 81 and the adjustable main speed control resistor 22 and the circuit arrangement 23 connected in series circuit relation.

The circuit arrangement 23 includes four rectifiers 24, 28, 29 and 30 connected as shown so that current will tend to flow through the vacuum tube 82 in only one direction. For one half of a cycle current will tend to flow from conductor 8 through the reactor 81, adjustable main-speed-control resistor 22, rectifier 24, anode 25, past grid 26 to cathode 27, and rectifier 28 to conductor 9 and during the second half of the cycle current will flow from conductor 9 through rectifier 29, anode 25, past grid 26 to cathode 27, rectifier 30, resistor 22 and reactor 81 to conductor 8. When the conductors 8 and 9 are first energized, i. e. the line switches, not shown, are closed the grid, being connected between the high resistance resistor 31 and the condenser 32 will be negatively charged and in consequence substantially no current will pass through tube 82. It will be noted that the negative terminal of the battery 33 is connected to the condenser 32 thus assuring a negative bias of the grid the instant the line switches are closed to energize conductors 8 and 9.

With each cycle of the alternating current the grid 26 becomes more and more positively charged and the result is that the tube 82 passes more and more current until eventually when the condenser 32 is completely charged the resistance of the tube circuit is very low. Since the primary of transformer 34 is connected at the mid-point 39 of resistor 21 and at the junction 40 any variation in the effective resistance below the junction 40 will shift the phase relation of the voltage in conductors 83 and 84, the conductors connected to the grids 19 and 20 of the tubes 10 and 11, respectively, relative to the voltage in conductor 38. Since conductor 38 is connected to the midpoint of transformer secondary 35 and since the anodes 15 and 16 are connected to the terminals of the secondary 5 of transformer 3 the voltages on anodes 15 and 16 and cathodes 17 and 18 will always be in phase. Any selected shift of the phase relation of the grid potentials 19 and 20 will cause these tubes to break down at any desired point of the cycle. The total result is that the gradual charging of condenser 32 causes tubes 10 and 11 to break down sooner during each cycle so that the voltage impressed on the motor may range from substantially zero to full voltage as determined by the magnitude of both halves of the wave, as may be readily apparent from a comparison of Figs. 8 to 10, inclusive.

Figure 10:
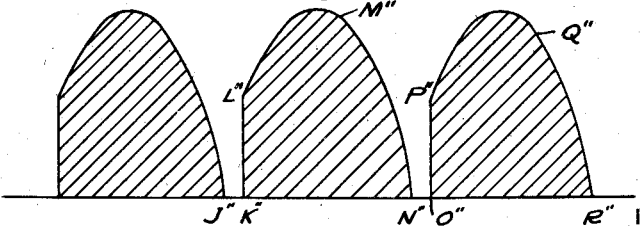

It should be remembered though that when condenser 32 has become completely charged the final speed of the motor may not be determined by the curve shown in Fig. 10, but will depend on the setting of the movable conductor 37. The position of conductor 37 determines the speed setting of the motor 1, and when the motor has accelerated in the automatic manner—protecting tubes 10 and 11 and the motor—the speed of the motor may be controlled as desired by manipulation of conductor 37 with reference to resistor 22.

Therefore, when the phase-shifting circuit has gone through its entire cycle of operation, the phase relation between the grid potential and the anode potential is relatively large, with the result that any one of the power grid-controlled tubes passes current during substantially the entire positive half cycle. Since two tubes are used the voltage impressed on motor 1 will be of the character shown in Fig. 10, or as a practical proposition, in view of the inductances of the circuits, substantially a direct current voltage having but slight variations is impressed on the motor 1.

The transformer 3 may be of any well known design, and if desired a plurality of secondary windings may be provided for heating the filaments 17 and 18.

Since the method of heating the filaments 17 and 18 of the tubes 10 and 11 does not constitute a part of this invention, heating circuits have been omitted to simplify the showings. It is, of course, obvious that a separate battery circuit, or a circuit interconnected with an additional secondary winding on the transformer 3 may be provided. The secondary winding 5 is provided with a mid-tap 14 and is connected in circuit relation with one terminal of the armature 12, whereas the other terminal of the armature is connected to the filaments or cathodes 17 and 18 of tubes 10 and 11 respectively, whereas the plates 15 and 16 of the respective tubes are connected to the end terminals of the secondary 5. In view of the fact that gas-filled grid controlled tubes operate as rectifiers in a well known manner unidirectional current is supplied to the armature 12. Since the nature of the unidirectional current is determined by the positive bias of the respective grids 19 and 20, the acceleration of the motor 1 may be controlled uniformly in a manner pointed out.

Figure 6:
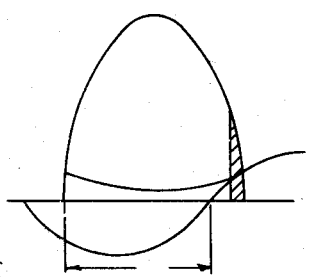
Fig. 6 is a similar graphical representation of the electrical characteristics of a power gas-filled grid controlled tube in which the relatively small shaded portion represents the time the current is flowing between the anode and the cathode at a larger phase angle than that shown in Fig. 5.
Figure 7:
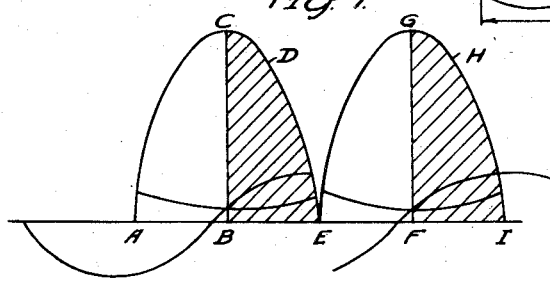
Fig. 7 is a graphical representation of the combined operation of two tubes.

Consider Figs. 5, 6 and 7 which represent by curves how the change in the grid potential relative to the anode potential varies the amount of current passing between the anode and the cathode. Referring particularly to Figs. 5, 6 and 7, the higher substantially sinusoidal wave or curve represents the anode potential and the lower substantially sinusoidal wave or curve represents the grid potential, and the concave-shaped curve represents the critical grid potential. So long as the grid potential is below the value of the critical grid potential no arc between the anode and the cathode is formed for passing current. As soon as the value of the grid potential rises to, or above, the critical grid potential ionization occurs at the point where the grid potential curve intersects the critical grid potential curve and an arc is formed for passing current between the anode and the cathode for the remaining part of the half cycle. In Figs. 5, 6 and 7, the shaded portions represent, respectively, the time the current is passing between the anode and the cathode during each half cycle for the illustrated phase angle displacements. Hence, it is possible to gradually and continuously vary the quantity of current passing between the anode and cathode from a minimum to a maximum by merely shifting by infinitesimal steps the phase of the grid potential relative to the anode potential.

Fig. 7 shows more in detail the total effect of the operation of the tubes 10 and 11 on the armature current. While each tube is in effect separately controlled the curves are, as shown, two independent operations but the current passing in the armature circuit will nevertheless be represented by the current wave designated by ABCDEFGHI. Since the potential drop across tubes 10 and 11 is relatively small, a voltage as the result of half the secondary winding 5 of the transformer 3 will be impressed on the armature during each half cycle. The length of time the voltage is applied depends upon the point at which the grid potential effects or permits a break down of the tube and may be represented by BE and FI, i. e., the angle or shift of phase between the anode potential and the grid potential.

Figure 8:
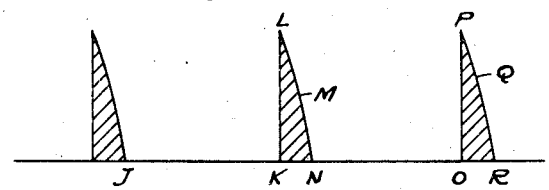
Figs. 8, 9 and 10 are graphic representations of the successively larger voltage values that are impressed in infinitesimal increments, on the motor to be accelerated.
Figure 9:
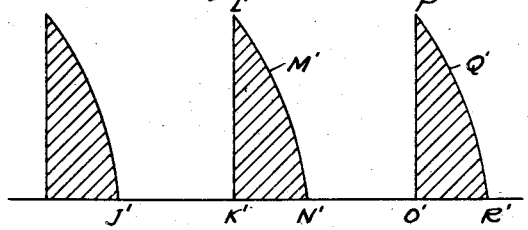

The inertia of the armature and the inductance of the armature and associated circuits will in fact prevent the armature current from taking the theoretical characteristics shown in Figs. 8, 9 and 10. The ripples will be smoothed out very materially. The feature of importance, however, is that the voltage impressed on the armature 12 of the motor 1 will vary from a small value in one direction to the full operating voltage in the same direction during an interval of time determined by the characteristics of the phase shifting circuit 13 and that such variation will proceed automatically, gradually and continuously, i. e., without any abrupt step by step changes. Figs. 8, 9 and 10 show curves JKLMNOPQR, J'K'L'M'N'O'P'Q'R', etc., which illustrate how the voltage on the armature 12 is varied automatically by the automatic operation of the phase shift circuit 13 heretofore explained.

In the modifications shown in Figs. 2 to 4 inclusive like elements have been given the same reference characters. The detailed description preceding thus applies equally well to these modifications except insofar as details of the phase shifting circuit work differently.

In Fig. 2 a pair of vacuum tubes are used to effect double wave control. It is obvious that for one half cycle current will flow through resistor 42, rectifier 43, condenser 44, battery 45 and for the other half it will flow through resistor 46, rectifier 47, condenser 48 and battery 49. As the condensers 44 and 48 become charged more and more, more current passes from the anodes 51 and 53 past grids 52 and 55 to cathodes 50 and 54. The motor 1 may thus be automatically accelerated to the speed determined by the adjustable resistor 22. It should be noted that a condenser 41 is used instead of a reactor. The final result is not affected by such change.

In the modification shown in Fig. 3 a pair of gas-filled grid-controlled tubes are utilized instead of vacuum tubes and a resistor 58 is utilized. In this modification as the condensers 56 and 57 became charged the positive bias of grids 60 and 64 will be brought to a critical value after some time and the tubes will break down, passing current from anodes 61 and 62 past the grids 60 and 64 to the cathodes 59 and 63. The acceleration of the motor thus proceeds automatically during a given time as if controlled by a one step-time-limited contactor.

In the modification shown in Fig. 4 a reactor and variable resistor are again utilized as in the modification of Fig. 1 but only one rectifier and one vacuum tube is utilized. After switch 65 is closed current for each succeeding positive cycle passes from conductor 8 through variable resistor 22, switch 65, reactor 81, battery 70 having a voltage high enough that the negative cycle does not permit a tendency of a reverse current, resistor 71, rectifier 72, condenser 73, and battery 75

14 to the conductor 9. As the condenser becomes charged the grid 76 becomes more positively charged with the result that more and more current passes from the anode 77 to cathode 75 thereby shifting the grid bias of tubes 10 and 11 to accelerate the motor 1.

From the foregoing discussion of the various modifications it is obvious that the "phase-shifting" circuits are essentially Wheatstone bridge arrangements wherein one pair of the two legs that are connected in series have equal impedances or, in some cases, resistances, whereas the other two legs that are connected in series are provided with means for manually varying the impedance of one leg as desired and are provided with time-limit means associated with the other leg to vary automatically and in a gradual and continuous manner the impedance a substantially fixed amount during a predetermined interval of time. The voltage variations thus effected at the terminals of the Wheatstone bridge not connected to the source of energy are utilized to control the operations of a motor. The controlling effect in the modifications shown is through a pair of gas-filled grid-controlled rectifying discharge tubes, but this invention is not limited to such arrangement. In fact, the control of the motor may be directly from the terminals of the Wheatstone bridge.

I am aware that other circuit arrangements may be devised by those skilled in the art once having had the benefit of the teachings of this invention. My claims are therefore not to be limited to the specific details herein disclosed but I intend that my claims be given only such limitations in scope as are required by their respective terms and the prior art.

I claim as my invention:

1. A system of control for a motor, in combination, a source of electrical energy, a motor, speed control means adapted to vary the speed of the motor over a predetermined range, control thermionic means having a cycle of operation that is completed within any predetermined interval of time and thermionic means, responsive to said control thermionic means, adapted to accelerate the motor to a speed selected by said speed control means.

2. A control system for an electric motor, in combination, a source of energy, a motor, means for connecting the motor to said source, a control electronic tube, means for varying the operating characteristics of said tube during a definite time interval, means controlled by said tube for gradually and automatically varying the voltage applied to the motor during said time interval and means for manually controlling the speed of the motor.

3. In a system of control for a direct current motor supplied with energy from a source of alternating current, in combination, a pair of grid-controlled tubes, having anodes, cathodes and grids, respectively, for supplying direct current to the motor, a time-delay circuit for shifting the phase relation of the voltage of the grid with reference to the cathode a predetermined angle in a predetermined time, whereby the motor is automatically accelerated to a selected speed in a definite time interval.

4. In a control system for an electric motor, in combination, a grid-controlled tube, having a grid, an anode and a cathode, adapted to vary the energy application to the motor from a given minimum to a selected maximum, time-limit means controlling such variations to take place during a definite interval of time, and further means controlling said tubes to vary the energy applications at will during operation of the motor.

5. In a control system for an electric motor, in combination, a source of alternating current, a motor, a gas-filled grid-controlled tube for supplying varying amounts of direct current to said motor from said source of alternating current, and time limit means for changing the operating characteristics of the said tube by a predetermined amount during a predetermined interval of time.

6. In a control system for an electric motor, in combination, a source of alternating current, a motor, a gas-filled grid-controlled tube for supplying varying amounts of direct current to said motor from said source of alternating current, time limit means for changing the operating characteristics of the said tube by a predetermined amount during a predetermined interval of time, and speed control means for changing the operating characteristics of said tube, at will during motor operation.

7. A control system for an electric motor comprising a motor, a thermo-electric timing means, control means for varying the time constant of said timing means, and means responsive to said timing means and to said control means to respectively accelerate said motor to a speed during a time determined by the time constant of said timing means and to control the speed of the motor.

8. In a control system for an electric motor comprising, a source of alternating current energy, a direct current motor, a grid-controlled tube for supplying direct current to said motor from said source of alternating current energy, a phase-shifting circuit for said tube whereby the speed of the motor may be varied at will, and a timing circuit for controlling said phase-shifting circuit to accelerate the motor to a given value.

9. In a system of control for a motor, a source of alternating current, a resistor connected to be energized by said source, a reactor, a variable resistor and a timing circuit, all connected in series in the order named, connected in parallel circuit relation to said resistor, a control transformer primary having one terminal connected to the mid-tap of said resistor and the other terminal connected intermediate the reactor and the variable resistor, a pair of grid-controlled tubes having grids, anodes and cathodes, a motor, a secondary of the control transformer having its outside terminals connected to the grids of said tubes, circuit connections for interconnecting one terminal of the motor with the cathodes and the other terminal with the mid-tap of the transformer and means for energizing the anodes of the tubes.

10. In a system of control for a motor, a source of alternating current energy, a resistor connected to be energized from said source, an impedance, a variable impedance, and a timing circuit, all connected in series circuit relation, connected in parallel to said resistor, a motor, grid-controlled tubes for controlling the motor, a control transformer having the end terminals of its primary connected respectively to the mid-tap of the resistor and intermediate the impedance and variable impedance and the end terminal of the secondary connected to the respective grids of the tubes, circuit connections for connecting the mid-tap of the secondary of the control transformer to the cathodes of the tubes and one terminal of the armature and means for interconnecting the anodes and other motor terminals with said source of energy.

11. In a control system for controlling the speed of a motor by a grid-controlled tube, a motor, a source of energy for energizing the motor, a phase-shifting arrangement comprising, a main resistor, a condenser, a variable impedance and a circuit arrangement adapted to automatically change its effective impedance a predetermined amount during a substantially definite time interval, said condenser, variable impedance and circuit arrangement being connected in parallel to said main resistor, an electric control device having a plurality of circuits one of said circuits being connected between the mid-tap of the main resistor and a point intermediate the condenser and variable impedance and other of said circuits being interconnected with the grid of said tube to control the potential of the grid.

12. In a control system for controlling the operations of a motor, a Wheatstone bridge, a motor, a source of electrical energy for energizing the motor and disposed to be connected to two junctions of the bridge, a control circuit arrangement connected to other two junctions, the relative impedances of the legs of the bridge being such at the instant energy is supplied to the first named junctions that substantially no current flows in said control circuit arrangement, an electrical automatically operable timing circuit for changing the impedance in one leg of the bridge a predetermined amount during a definite interval of time to increase the current flow in the control circuit a given amount during such interval of time, means associated with the leg in series with the leg provided the timing circuit for manually varying the impedance of said leg, and means responsive to the current characteristics in the control circuit arrangement for controlling the operation of said motor.

13. A system of control for a motor, a source of power, a motor, a Wheatstone bridge having two of its terminals connected to the source of power and having two of the legs that are connected in series of equal impedance, the other two legs that are connected in series having respectively manual means for varying the impedance of one leg and automatic time-limit means for varying the impedance of the other leg a selected amount during a substantially fixed interval of time, means for energizing said motor from said source of power, and means responsive to the potential variations effected at the other two terminals of the bridge to control the energization of said motor.

14. A system of control for a motor, a source of alternating current energy, a direct-current motor, a grid-controlled tube having a grid, an anode and a cathode adapted to supply direct current of varying potential to said motor from said source of alternating current, said potential variations of the direct current being dependent upon the grid potential of said tube, a Wheatstone bridge having two of its terminals connected to the source of energy and having two of the legs that are connected in series of equal resistance, the other two legs that are connected in series having one leg provided with means for manually varying the resistance and the other leg provided with electrical time-limit means for automatically varying the resistance a given value during a substantially fixed interval of time and means responsive to the potential variations thus effected at the other terminals of the bridge to vary the grid potential of said tube.

15. A control system for an electric motor, in combination, a source of energy, means for connecting the motor to the source of energy, speed control means for the motor, thermionic means independent of said speed control means for controlling the acceleration of the motor, and timing means, operable during a substantially definite time interval, adapted to control the thermionic means.

16. In a control system for an electric motor, in combination, a source of alternating current, a motor, a grid-controlled electric discharge device for supplying varying amounts of direct current to said motor from said source of alternating current, and time-limit means, including a capacitor and a grid-controlled electric discharge device, adapted to change the operating characteristics of said first named electric discharge device by a given amount during a given interval of time to thus govern the rate of acceleration of said motor.

17. In a control system for an electric motor, in combination, a source of alternating current energy, a direct current motor, a grid-controlled electric discharge device interconnected with said source of alternating current and said motor and adapted to supply direct current to said motor from said source of alternating current, a phase-shifting circuit-arrangement for said electric discharge device whereby the effective direct current voltage impressed on said motor is varied to control the speed of said motor at will, and a timing device including a grid-controlled electric discharge device and capacitor interconnected with each other, said timing device controlling the operating characteristics of said phase-shifting circuit-arrangement to control the rate of acceleration to the speed selected for said motor by said phase-shifting circuit-arrangement.

LAWRENCE R. QUARLES.